United States Patent [19]
Marks

[11] Patent Number: 5,839,744
[45] Date of Patent: Nov. 24, 1998

[54] VEHICLE TOWING HITCH

[76] Inventor: Thomas V. Marks, R. D. # 9 Box 546, Greensburg, Pa. 15601

[21] Appl. No.: 661,406
[22] Filed: Jun. 7, 1996
[51] Int. Cl.⁶ .................................................. B62D 53/00
[52] U.S. Cl. ....................................... 280/416.4; 280/511
[58] Field of Search ................................ 280/511, 415.1, 280/416.1, 491.5

[56] References Cited

U.S. PATENT DOCUMENTS

| | | | |
|---|---|---|---|
| 3,801,134 | 4/1974 | Dees | 280/416.1 |
| 3,922,006 | 11/1975 | Borges | 280/416.1 |
| 4,029,333 | 6/1977 | Christensen | 280/416.1 |
| 4,214,772 | 7/1980 | Carr et al. | 280/416.1 |
| 4,248,450 | 2/1981 | McWethy | 280/416.1 |
| 4,280,713 | 7/1981 | Bruhn | 280/490.1 |
| 4,411,298 | 10/1983 | Ellingsen et al. | 280/415.1 |
| 4,568,098 | 2/1986 | Landry, Jr. | 280/416.1 |
| 4,697,818 | 10/1987 | Moore | 280/416.1 |
| 5,106,114 | 4/1992 | Haupt | 280/416.1 |

*Primary Examiner*—Daniel G. DePumpo
*Attorney, Agent, or Firm*—Lawrence R. Burns

[57] ABSTRACT

The present invention comprises a vehicle towing hitch having a hollow polygonal tubular section with opposing ends and multiple side walls surrounding the hollow portion. Different size towballs are mounted on the radially outward side of at least three of the side walls and a vehicle mounting fixture is provided for connection between a vehicle and the tubular section. Co-operating means of rotatable attachment are located between the mounting fixture and the tubular sections with spring loaded means for releasably holding the mounting fixture and the tubular section in a fixed position one to the other. A pintle hook is mounted on a pintle block with co-operating elements of telescopic engagement between the pintle block and the tubular section.

1 Claim, 5 Drawing Sheets

VEHICLE TOWING HITCH

BACKGROUND OF THE INVENTION

This invention has to do with vehicle towing hitches and is especially concerned with a towing hitch having multiple towballs arranged on a rotatable section so that different sized towballs may be selected as desired. It is a usual practice to attach vehicles together for towing purposes and to accomplish a power-driven vehicle that has attached to its rear a connection device so that it may be connected to a second vehicle that will follow the power-driven vehicle.

When attaching the vehicles together by towing devices, a hitch is used that generally consists of a towball and may even have a pintle attached to it. The towballs come in several sizes. The towball may have a 2 inch diameter ball, which usually has a load rating of 5,000 pounds, or a 2 5/16 inch diameter ball which may have a load rating of 7,000 pounds. For load ratings greater that 7,000 pounds, a pintle hook may be used to sustain the greater load between the vehicles. Typically the truck owner, when he adapts the power-driven vehicle for towing of the second vehicle, is furnished with one size towball that is suited for the vehicle to be towed. It is not uncommon, however, for a vehicle owner to have several vehicles that must be towed requiring the vehicle owner to change tow hitches for the different load ratings for the different loads that may be encountered during the towing.

It is with this in mind that the present invention may be of great convenience to an automobile owner to be able to have a tow hitch wherein several different sized towballs may be easily selected depending on the load rating, even including the selection of a pintle hook for the much greater loads that may be encountered.

OBJECTS OF THE INVENTION

It is an object of the present invention to provide a multiple towball hitch for automobile vehicles.

It is an object of the present invention to provide a safe, efficient and reliable multiple towball hitch for automotive vehicles.

It is an object of the present invention to provide a towball hitch with a rapid and easy selection of multiple towball hitches.

It is an object of the present invention to provide a vehicle towing hitch having a rotatable member for the selection of towball hitches.

It is an object of the present invention to provide a towball hitch providing a rapid and easy selection of multiple towballs.

It is an object of the present invention to provide a more efficient and easier to operate multiple towball hitch for vehicles.

It is a object of the present invention to provide a carousel of towballs and a rotatable member that may be operated by the release of a spring-loaded mechanism so as to select a desired towball for different apparitions.

It is a further object of the present invention to provide a safe, reliable, and efficient towing hitch that is adaptable for different towing loads.

SUMMARY OF THE INVENTION

A vehicle towing hitch having a hollow polygonal tubular section with opposing ends and multiple side walls surrounding the hollow portion. Different size towballs are mounted on the radially outward side of at least three of the side walls and a vehicle mounting fixture is provided for connection between a vehicle and the tubular section. Co-operating means of rotatable attachment are located between the mounting fixture and the tubular sections with spring loaded means for releasably holding the mounting fixture and the tubular section in a fixed position one to the other. A pintle hook is mounted on a pintle block with co-operating elements of telescopic engagement between the tubular section.

Preferably the rotatable attachment between the mounting fixture and the tubular section will have a plate attached to and covering one end of the tubular member with a central perforation through the plate and stud connected to the said mounting fixture and extending through the perforation. A fastener on the stud will hold the tubular section to the mounting fixture.

DETAILED DESCRIPTION OF THE DRAWINGS

Figure 1:
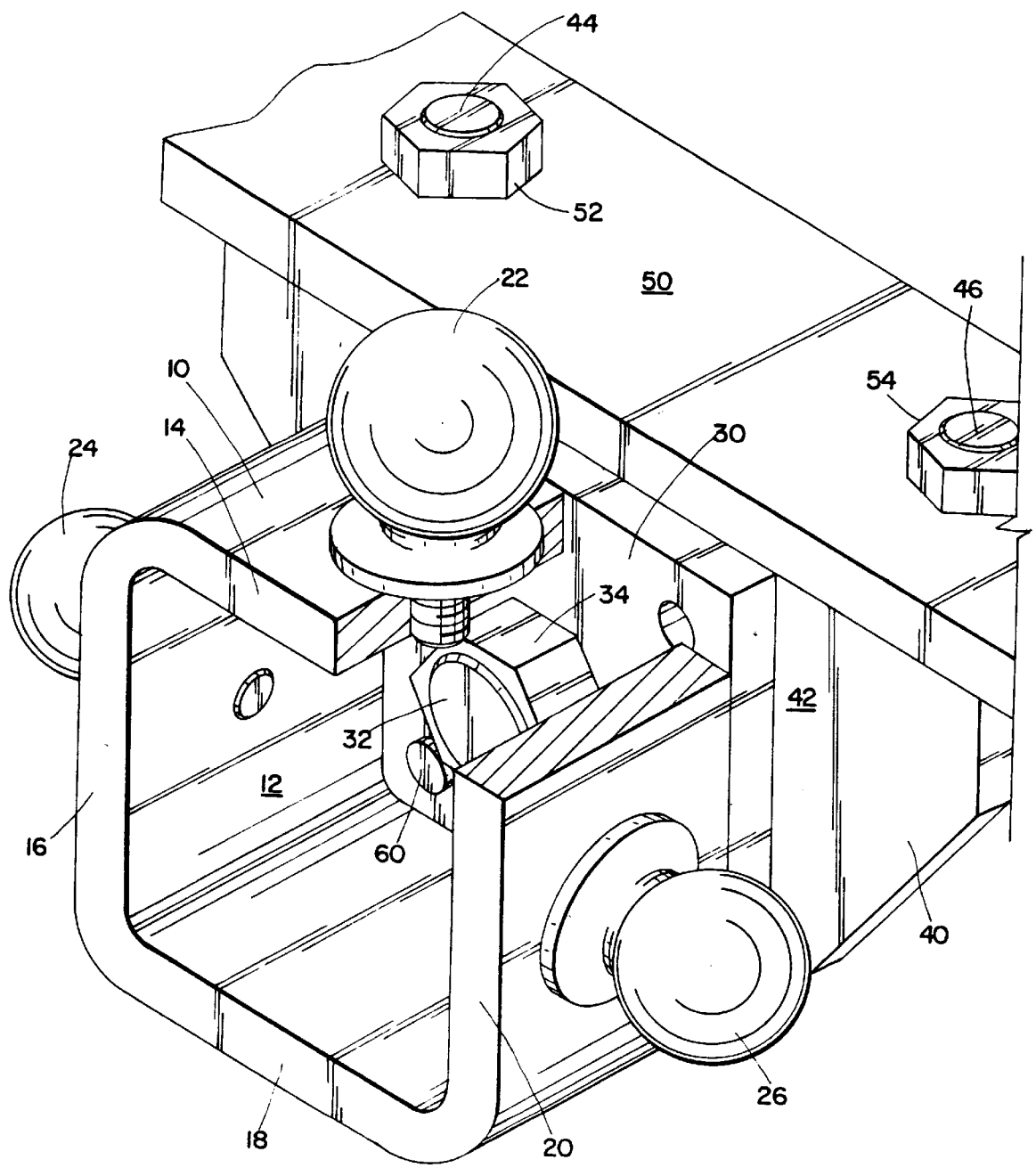
FIG. 1 is a perspective view of a tow hitch according to the present invention.

What is shown in FIG. 1 is a towing hitch 10 according to the present invention which comprises a tubular section 12 having sidewalls 14, 16, 18 and 20. In this case, the tubular section 12 is shown as being a hollow rectangular tubular section when viewed in end view. Mounted on the sidewalls 14, 16 and 20 are towballs 22, 24 and 26. The sidewalls 14, 16, 18 and 20 are preferably substantially planar in nature on the radially outward sides so as to accept different sized towballs 22, 24 and 26. The normal size or standard sizes used for a towball is 2 inches, 2 1/16 inches, and 2 1/8 inches, and therefore towballs 22, 24, and 26 may have those sizes respectively. However, it is to be understood that it may be necessary for a person to use a different size towball for each rated load capacity of the vehicle to be towed and therefore other sizes may be used as necessary. As can be seen, the tubular section 12 has an open end facing toward the left side at FIG. 1, but on its opposite end is a plate member 30 that is attached and acts as a closure to the opposing open end of the tubular section 12 with the plate attached as by welding to the ends of sidewalls 14, 16, 18 and 20. A central perforation in plate member 30 (not shown in FIG. 1) allows stud member 32 to extend through the plate member 30 so that nut 34 may be secured to the stud member and secure the plate 30 and tubular section 12 to the mounting fixture 40. Mounting fixture 40 is shown having a means or face 42 for mating with the plate 30 and with the stud or bolt member 32 extending through the back of plate 42, through and outward from plate 30 therefrom. Fastener studs 44 and 46 extend up from mounting fixture 40 and through a bumper plate 50 of a vehicle. Fastener nuts 52 and 54 are used to secure the entire assembly to a vehicle having the bumper plate 50. The stud 32 and the nut 34 that extend from the face 42 of the mounting fixture 40 allow the entire tubular section 12 to rotate clockwise or counter-clockwise so that different towballs 22, 24 and 26 may be presented to the top of the drawing shown in FIG. 1. Shown extending through the plate 30 is the outward end of releasable pin 60 which will be described later.

Figure 2:
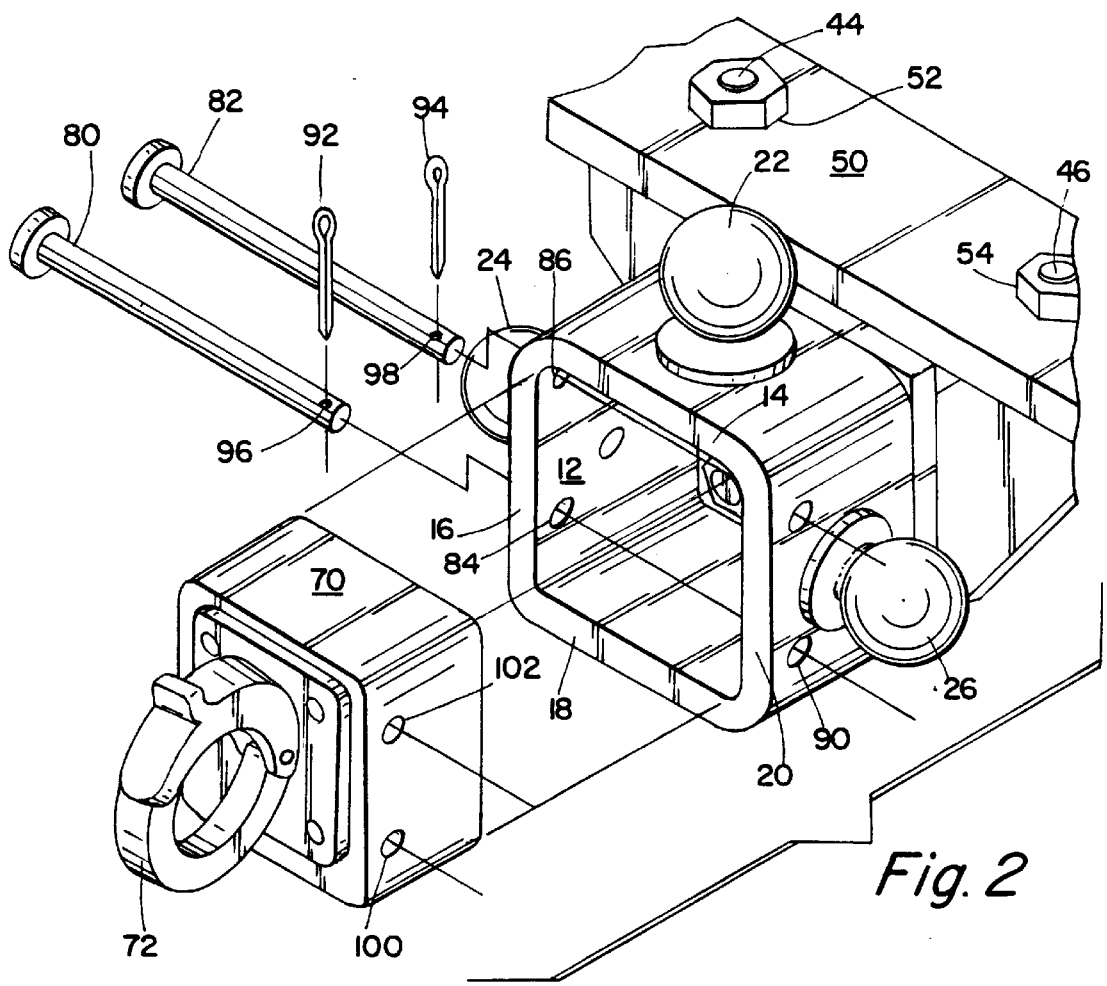
FIG. 2 is an exploded perspective view of a tow hitch and pintle hook according to the present invention.

Shown in FIG. 2 is the bumper plate 50 having the studs 44 and 46 and nuts 52 and 54 holding the entire assembly onto the bumper 50. The towballs 22, 24 and 26 are shown mounted onto the tubular section 12. Also shown in FIG. 2 is a pintle block 70 having a pintle hook 72. The pintle block 70 is preferably rectangularly shaped in size so as to telescopically fit into the hollow section of 12 and within the walls of 14, 16, 18 and 20 of the tubular section 12. In order to hold the pintle block 70 in the tubular section 12, pins 80 and 82 will be put through the perforations shown at 84, 86, 88 and 90. Pins 92 and 94 will fit through the perforations 96 and 98 shown on the ends of the pins 80 and 82. Perforations 100 and 102 extend laterally through the entire pintle block 70 and are adapted to line up with perforations 84, 86, 88, and 90 when the pintle block is telescopically engaged within the tubular section 12 so as to receive the bodies of pins 80 and 82. In this manner, the pintle block will be fastened securely to the tubular section 12 and will rotate with the tubular section 12 when desired to change towballs from one position to another.

Figure 3:
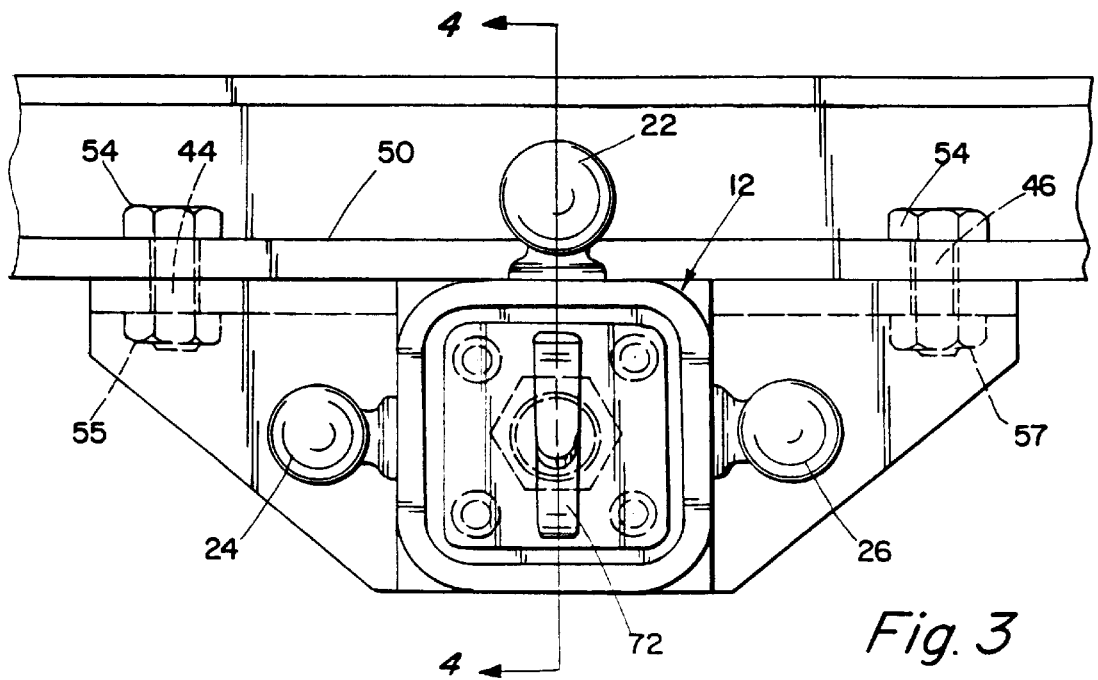
FIG. 3 is a rear plan view of a tow hitch according to the present invention.

Shown in FIG. 3 is an end view of the towball hitch 10 shown according to the present invention. It is shown again as the tubular section 12 with the towballs 22, 24, and 26 attached to the rotatable plate 30 and having the pintle hook 72 attached thereto. The mounting plate or bumper plate 50 is shown with the threaded or fastener studs 44 and 46 shown attaching the towball hitch to the bumper plate 50 by means of threaded or fastener nuts 52 and 54. Simultaneously on the bottom part threaded or fastener nuts 55 and 57 attach the bottom part of the threaded or fastener studs 44 and 46 so that the mounting fixture plate 40 is held securely to the bumper plate 50. As has been mentioned before, the rectangular section 12 has its mounting plate 30 which is rotatably attached through stud 32 to the mounting plate 40 such that the tubular section 12 may be rotated so as to have towball 26 in the uppermost position where 22 is now located and 24 being the lowermost position when that rotation is desired.

Figure 4:
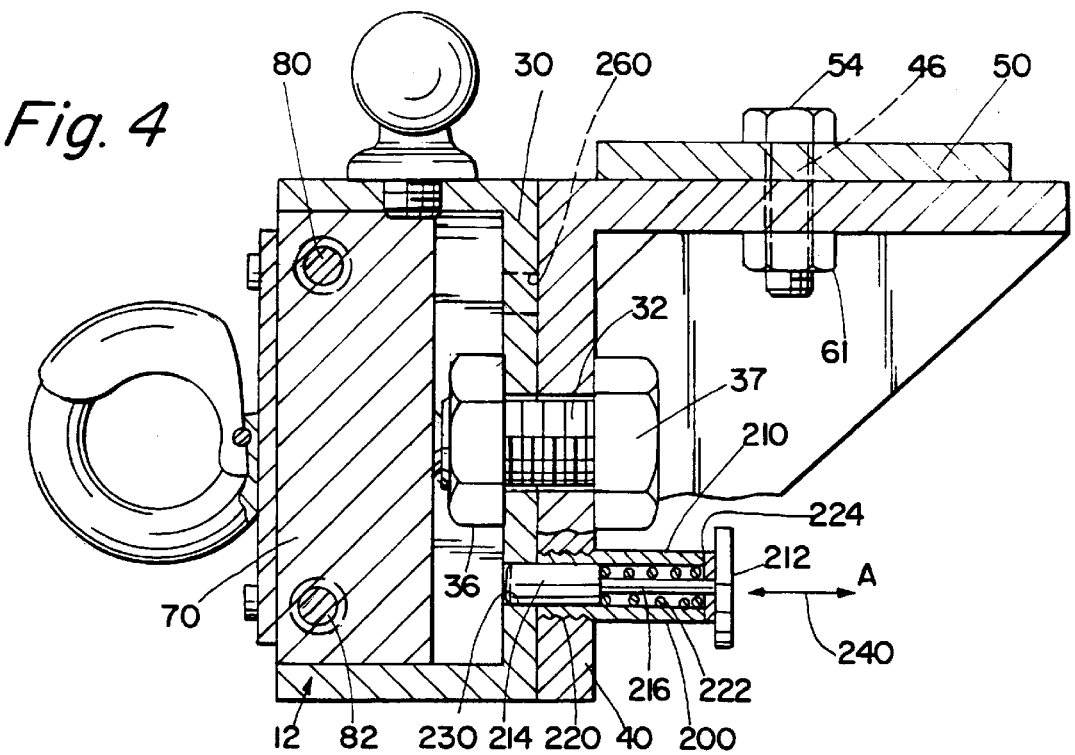
FIG. 4 is a view (4/4) through FIG. 3 of the tow hitch according to the present invention.

What is shown in FIG. 4 is a view 44 through FIG. 3. In FIG. 4 the pintle 72 is shown attached with the pintle block 70 and having the pins 80 and 82 securing the pintle block 70 to the tubular section 12 as was previously described in FIG. 1. The tubular section 12 is rotatably mounted with plate 30 with the mounting plate 40 by means of the fastener stud 32 with nuts and 37 on each end of the stud 32. The stud 32 and nuts 36 and 37 are adjusted so that the plate 30 will be freely rotatable with regard to the mounting plate 40. The bumper plate 50 is shown attached to the mounting fixture 40 by means of the hex head bolt 54 and the nut 61 attaching to the threaded end of the hex head bolt 54. A spring pin assembly is shown at 200 and consists of a body 210 having a plunger mechanism 212 that consists of a pin portion 214 with a reduced diameter section shown at 216. The body 210 has a threaded or welded engagement with the mounting fixture as shown at 220 and a spring 222 is mounted between the end 224 of the body 210. The pin member 214 is shown extending into a perforation 230 that is formed in the back plate 30 of the tubular section 12 such that when the spring assembly 200 is in its natural position the pin member 214 is urged into the perforation 230 and holds plate 30 and therefore tubular section 12 from any possible rotation. When it is desired that plate 30 and the tubular section 12 should be rotated so as to put a different towball hitch in the operable position, plunger 212 will be pulled in direction (a) as shown by the arrow 240 and the pin 214 may disengage from the perforation 230 on plate 30. When in this position the plate 30 is fully rotatable and may be rotated until another perforation shown at 260 are four different hole locations aligned with the pin 214. At that point the head 212 may be release and the spring will automatically push the plunger 214 into the new perforation 260 thereby locking the plate and tubular section from any further rotation and making it operable for a towing operation.

Figure 5:
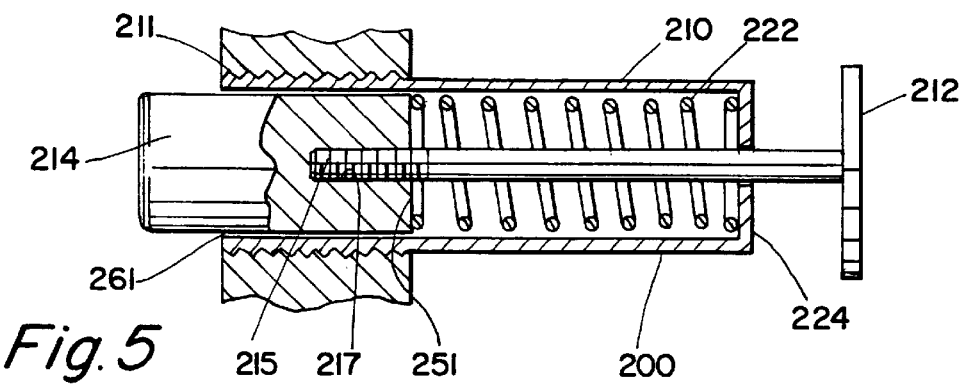
FIG. 5 is a side view of a spring-loaded pintle means used with the tow hitch according to the present invention.

What is shown In FIG. 5 is a more detailed view of the spring pin assembly 200 showing the plunger head 212, the spring 222 and the body 210. The body 210 is shown threadedly engaged or welded as at 211 with the plate 30 and has the pin portion 214 threadedly engaged as is shown at 215 with the bottom portion 217 of stem 219. Stem 219 extends from the head 212 to the threaded section 217 so as to threadedly engage the pin portion 214. The uppermost part of the body 210 is shown at 224 and with the spring 222 captively held between the uppermost portion 224 of the body 210 and the abutting portion 251 of the pin portion 214 cannot be seen but in its relaxed state the pin portion 214 will be pushed as far out of the end 261 of the body 210 as possible where in this position the pin 214 will be able to engage the perforations of 260 or 230 or more as one desires.

Figure 6:
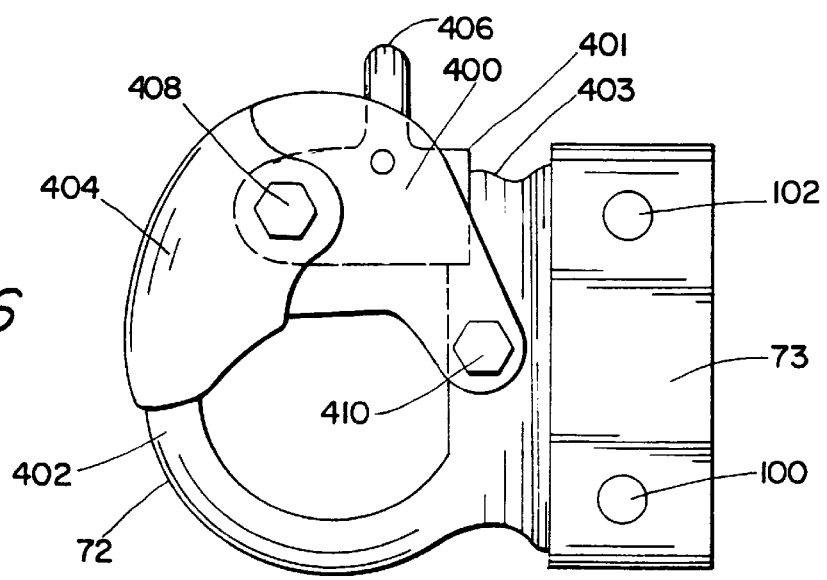
FIG. 6 is a side view of the pintle hook according to the present invention.

What is shown In FIG. 6 is the pintle hook 72 having a pintle block 73 with perforations 102 and 100 as has been previously described. The pintle hook has a latch mechanism shown at 400 that comprises a bottom hook section 402 that mates with an upper hook section 404 and has a lever release mechanism 406. Moving the lever 406 in a direction away from the hitch assembly 10 raises the abutment 01 away from its co-operating abutment surface 403. Upper hook section 404 then can pivot about pivot point 410 upwardly and away from 401 thus opening the pintle hook 72.

Figure 7:
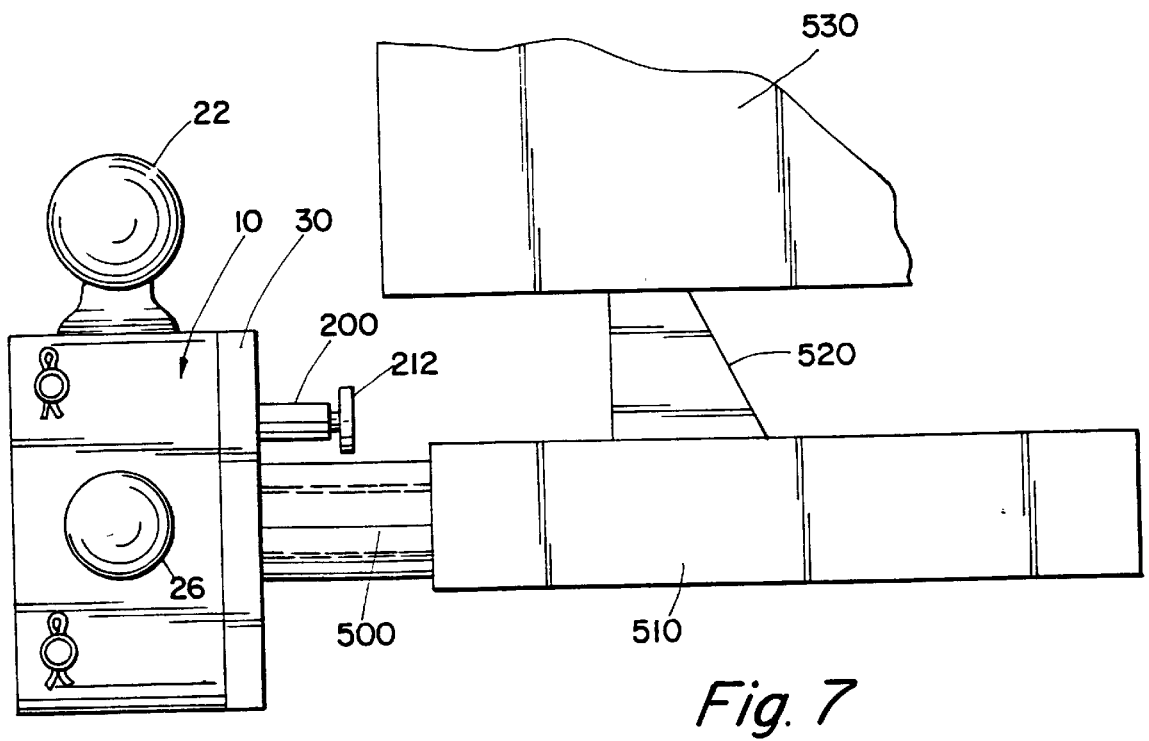
FIG. 7 is an alternate mounting means for the tow hitch according to the present invention.

Shown in FIG. 7 is a different attachment arrangement for the towball hitch assembly 10 according to the present invention wherein the towball hitch assembly 10 has the towball 22 in the uppermost position showing the towball hitch 26 at the side position. The spring assembly 200 is shown with the plunger head 212 to the rear of the towball hitch and extending through the plate 30. The mounting arrangement is shown with the rear of the towball hitch having a rectangular attachment bar 500 telescopically engaging a similarly rectangularly shaped tube 510. The tube 510 is attached by a plate 520 to the bottom plate 530 of an automobile.

Figure 8:
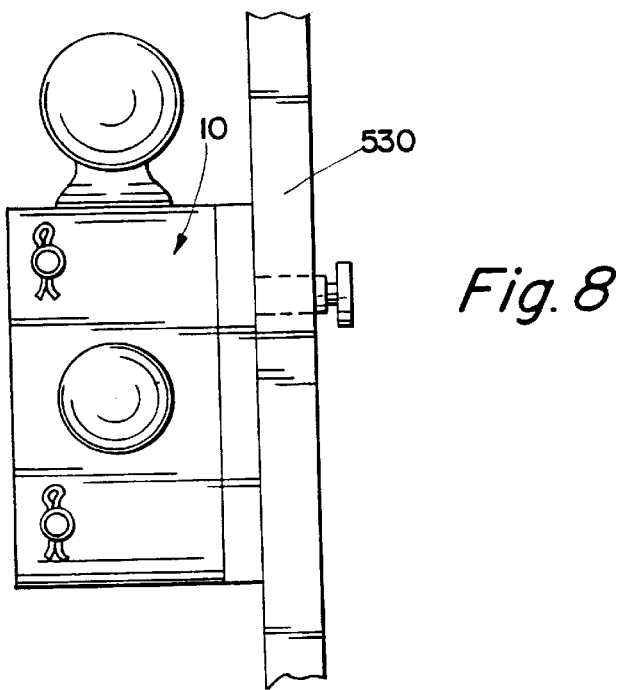
FIG. 8 is side view of a mounting plate and tow hitch according to the present invention.
Figure 9:
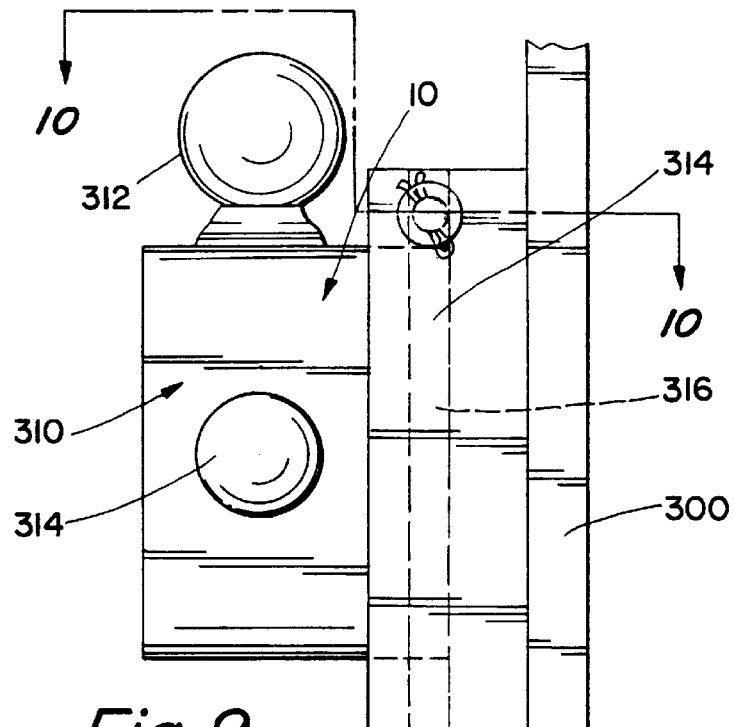
FIG. 9 is a side view of another mounting arrangement according to the present invention.
Figure 10:
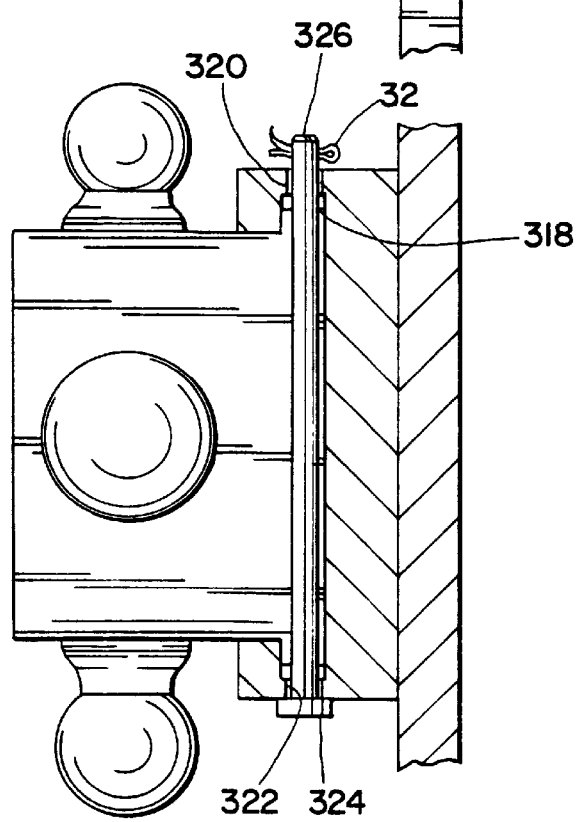
FIG. 10 is a sectional view 10—10 through FIG. 9.

What is shown in FIG. 8 is plate 530 having four mounting holes 580 located at the four outer corners of the plate. The four holes are for specifically attaching the assembly 530 to the existing vehicle plate 531 of the tow vehicle. Locking pin 200 will extend through existing vehicle plate 531. Locking pin 200 will secure the hitch assembly 10 from rotating until locking pin 200 is pulled to release the pin portion 214 as shown in FIG. 5 allowing the hitch assembly to rotate desired towing ball.

I claim:
1. A vehicle towing hitch which comprises:
   a. a hollow polygonal tubular section having opposing ends and multiple side walls surrounding said hollow portion;
   b. a towball mounted on the radially outward side of at least three of said side walls;
   c. a vehicle mounting fixture for providing connection between a vehicle and said tubular section;
   d. co-operating means of rotatable attachment between said mounting fixture and said tubular sections;
   e. spring loaded means for releasable holding said mounting fixture and said tubular section in a fixed position one to the other;
   f. a pintle hook mounted on a pintle block;
   g. co-operating elements of telescopic engagement between said pintle block and said tubular section;
   h. releasable means for holding said pintle block telescopically engaged to said tubular section;
   i. said rotatable attachment between said mounting fixture and said tubular section comprising a plate attached to and covering one end of said tubular member;
   j. a central perforation through said plate and stud means connected to said mounting fixture and extending through said perforation;
   k. fastener means on said stud means to hold said tubular section to said mounting fixture.

* * * * *